(12) United States Patent
Chavez et al.

(10) Patent No.: US 9,478,145 B1
(45) Date of Patent: Oct. 25, 2016

(54) UNREASONABLE ANSWER FILTER

(71) Applicant: International Business Machines Corporation, Armonk, NY (US)

(72) Inventors: Aaron J. Chavez, Denver, CO (US); Gregory W. Schoeninger, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/950,698

(22) Filed: Nov. 24, 2015

(51) Int. Cl.
*G06F 17/30* (2006.01)
*G09B 7/00* (2006.01)
*G09B 5/00* (2006.01)

(52) U.S. Cl.
CPC .. *G09B 7/00* (2013.01); *G09B 5/00* (2013.01)

(58) Field of Classification Search
None
See application file for complete search history.

(56) References Cited

U.S. PATENT DOCUMENTS

| 6,092,043 | A | 7/2000 | Squires et al. | |
|---|---|---|---|---|
| 8,346,701 | B2 | 1/2013 | Wang et al. | |
| 2006/0106796 | A1* | 5/2006 | Venkataraman ... | G05B 23/0216 |
| 2006/0235689 | A1* | 10/2006 | Sugihara ............ | G06F 17/2785 |
| | | | | 704/257 |
| 2011/0137919 | A1* | 6/2011 | Ryu .................. | G06F 17/30958 |
| | | | | 707/748 |
| 2012/0078889 | A1* | 3/2012 | Chu-Carroll ...... | G06F 17/30654 |
| | | | | 707/723 |
| 2012/0078911 | A1* | 3/2012 | Johnston .......... | G06F 17/30707 |
| | | | | 707/738 |
| 2012/0330976 | A1* | 12/2012 | Tsuchida ............ | G06F 17/2276 |
| | | | | 707/749 |
| 2013/0017524 | A1 | 1/2013 | Barborak et al. | |
| 2014/0201126 | A1* | 7/2014 | Zadeh .................... | G06K 9/627 |
| | | | | 706/52 |
| 2015/0186514 | A1* | 7/2015 | Singh ................ | G06F 17/30864 |
| | | | | 707/709 |
| 2015/0332670 | A1* | 11/2015 | Akbacak .............. | G10L 15/063 |
| | | | | 704/9 |
| 2016/0048772 | A1* | 2/2016 | Bruno ...................... | G06N 5/04 |
| | | | | 706/11 |

OTHER PUBLICATIONS

Kosseim et al., "4. Filtering Out Bad Answers with Semantic Relations in a Web-Based Question-Answering System," Apr. 2004, TALN '04, Workshop Question-Response, 8 pages.

* cited by examiner

*Primary Examiner* — Haroon H Hasan
(74) *Attorney, Agent, or Firm* — VanLeeuwen & VanLeeuwen; William J. Stack (57) ABSTRACT

An approach is provided in which a knowledge manager computes a set of unreasonable answer probabilities based upon a corresponding set of answers. Each of the set of unreasonable answer probabilities indicate a likelihood that its corresponding answer is an unreasonable answer to a question received by the knowledge manager. The knowledge manager determines that one or more unreasonable answers are included in the set of answers based upon determining that their corresponding unreasonable answer probabilities are above a threshold. In turn, the knowledge manager removes the one or more unreasonable answers from the set of answers and provides a modified set of answers to a user.

17 Claims, 6 Drawing Sheets

UNREASONABLE ANSWER FILTER

BACKGROUND

The present disclosure relates to incorporating an unreasonable answer filter into a question answer system that filters out unreasonable answers within a set of answers prior to presenting the set of answers to a user.

A question answer system answers questions posed in a natural language format by applying advanced natural language processing, information retrieval, knowledge representation, automated reasoning, and machine-learning technologies. Question answer systems differ from typical document search technologies because document search technologies return a list of documents ranked in order of relevance to a word query, whereas question answer systems receive a question expressed in a natural language, seeks to understand the question in much greater detail, and returns a precise answer to the question.

Generally, question answer systems analyze a knowledge base to determine a set of candidate answers. The question answer systems then utilize multiple scorers that attempt to score each of the candidate answers based upon several different criteria. At times, question answer systems determine that a particular term is the correct answer because, for example, the term is in proximity to terms in the question on multiple occasions within the knowledge base.

BRIEF SUMMARY

According to one embodiment of the present disclosure, an approach is provided in which a knowledge manager computes a set of unreasonable answer probabilities based upon a corresponding set of answers. Each of the set of unreasonable answer probabilities indicate a likelihood that its corresponding answer is an unreasonable answer to a question received by the knowledge manager. The knowledge manager determines that one or more unreasonable answers are included in the set of answers based upon determining that their corresponding unreasonable answer probabilities are above a threshold. In turn, the knowledge manager removes the one or more unreasonable answers from the set of answers and provides a modified set of answers to a user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
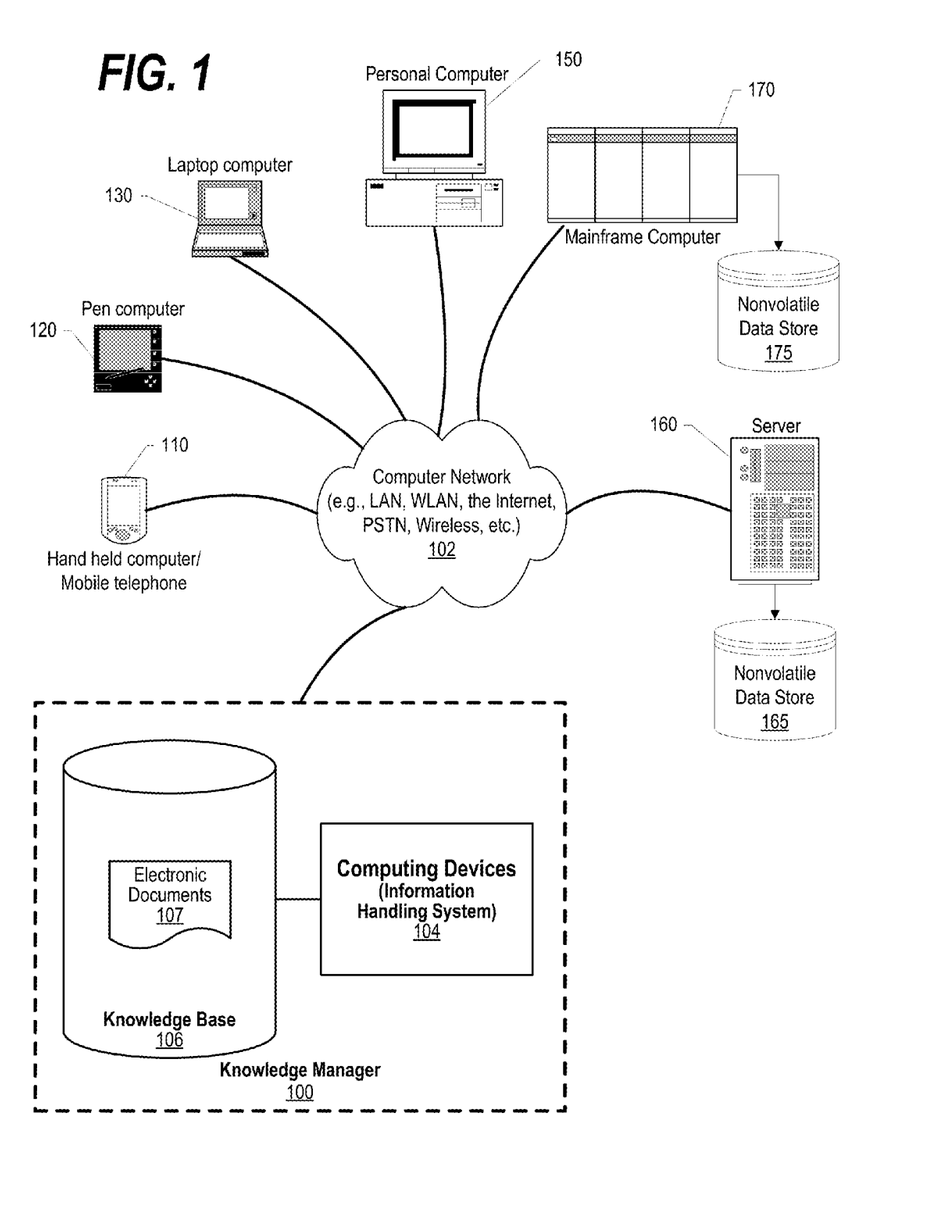
FIG. 1 is a block diagram of a data processing system in which the methods described herein can be implemented.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
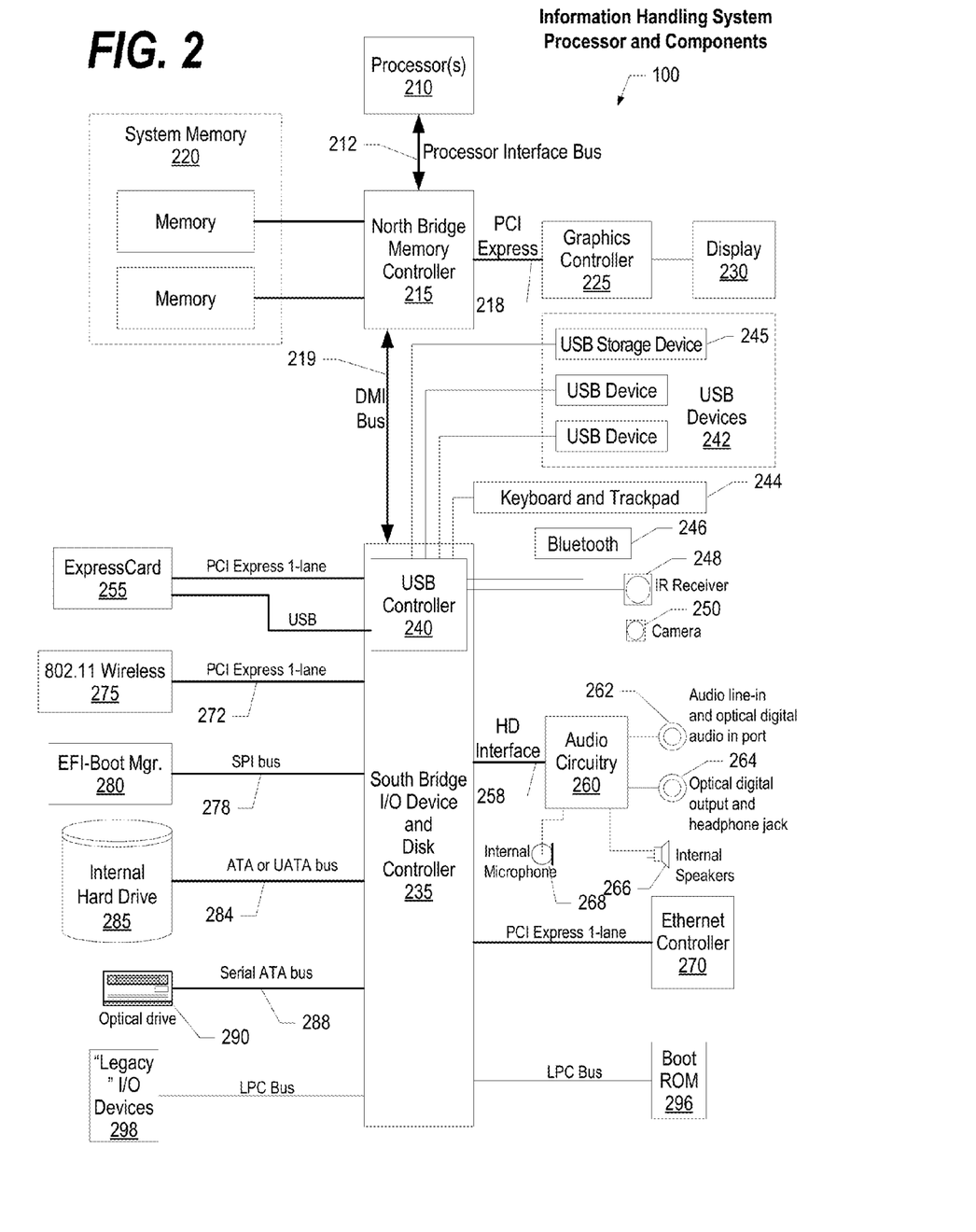
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3 through 9 depict an approach that can be executed on an information handling system. The information handling system may be a question answer system that trains an unreasonable answer filter using a set of training data that includes unreasonable answers. During the training process, the unreasonable answer filter develops hyperplanes that delineates between incorrect answers, correct answers, and "unreasonable" answers. For example, "front door" would be an unreasonable answer to "What did Tom have for dinner?"

The question answer system, in one embodiment, incorporates the unreasonable answer filter at the end of a question answer system pipeline. The question answer system pipeline identifies and ranks a set of candidate answers to a question, which feed into the unreasonable answer filter. The unreasonable answer filter analyzes features of each of the candidate answers to generate unreasonable answer probabilities, which are probabilities that the corresponding candidate answer is an unreasonable answer to a received question. In turn, the question answer system removes those candidate answers having high unreasonable answer probabilities from the set of candidate answers prior to presenting the set of candidate answers to a user.

Figure 3:
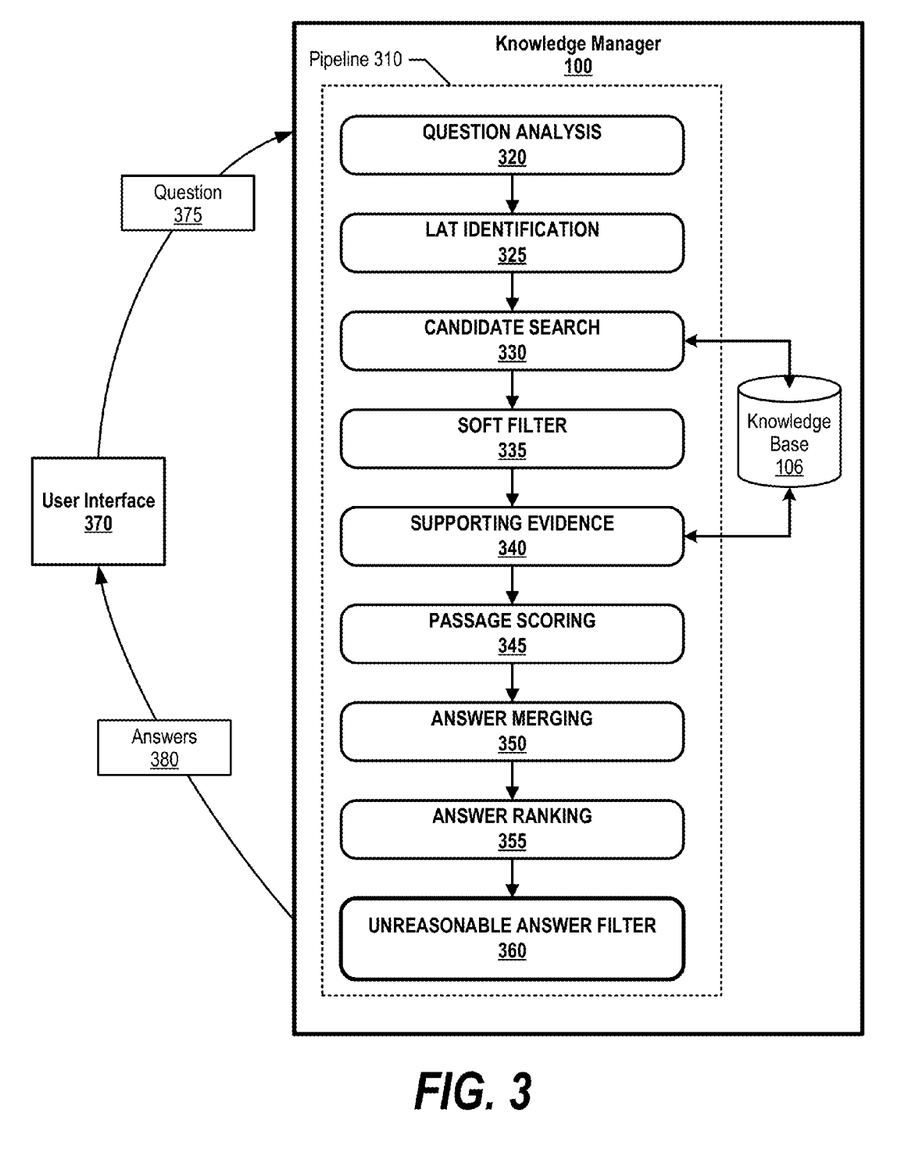
FIG. 3 is an exemplary diagram depicting a knowledge manager that generates answers to a received question and applies an unreasonable answer filter at the end of a pipeline to remove unreasonable answers to the question.

FIG. 3 is an exemplary diagram depicting a knowledge manager that generates answers to a received question and applies an unreasonable answer filter at the end of the pipeline to remove unreasonable answers to the question. Knowledge manager 100 receives question 375 from user interface 370 and feeds question 375 into pipeline 310. Pipeline 310 includes stages 320 through 360, which each perform various functions to provide answers to question 375 with a highest probability of success.

Question analysis 320 analyzes question 375 and identifies items such as concepts, keywords, entities, etc., within the question. Lexical answer type (LAT) identification 325 evaluates the output from question analysis 320 to identify the "type" of thing for which question 375 is asking. Candidate search 330 performs a search on knowledge base 106 using the output from LAT identification 325 to identify a first pass set of candidate answers.

Soft filter 335 applies first pass scores to the first pass set of candidate answers based upon, for example, a knowledge graph generated from a web crawl phase that produces entity relationships such as parent→child relationships, object-→attribute relationships, SVO (subject-verb-object) relationships, etc., which indicate how entities relate to one another in the world, given a large unstructured dataset.

Supporting evidence 340 accesses the knowledge base to evaluate the supporting evidence of the first pass set of candidate answers. In one embodiment, supporting evidence 340 performs a search for more information about each candidate answer generated from candidate search phase 330 that has also passed through soft filter 335. In this embodiment, supporting evidence 340 evaluates a question as a clue and reissues more searches into knowledge base 106 to identify several new passages to consider for each candidate answer.

Passage scoring 345 evaluates the output from supporting evidence 340 and, in one embodiment, uses multiple passage scoring algorithms to score the passages that correspond to the candidate answers. Answer merging 350 merges equivalent candidate answers based upon, for example, Wikipedia redirects, YAGO, DBPedia disambiguations, and knowledge graph discoveries. Answer ranking 355 ranks the remaining candidate answers based upon the passage scoring information. At this point, answer ranking 355 produces a set of ranked answers based upon the probability that they are the correct answer to question 375.

Unreasonable answer filter 360 analyzes the set of ranked answers from a different perspective and removes answers from the set of ranked answers that have a high probability that they are an unreasonable answer to question 375. In other words, unreasonable answer filter 360 removes answers that could easily be ruled out by human judgement. For example, question 375 may be "Who killed Joseph Smith?" and knowledge manager 100 located a passage in knowledge base 106 that states:

The ensuing threat of violence prompted Smith to call out a militia in the Mormon town of Nauvoo, Ill. He was charged with treason and conspiracy by Illinois authorities and imprisoned with his brother Hyrum in the Carthage city jail. On Jun. 27, 1844, an anti-Mormon mob stormed in and murdered the brothers.

Knowledge manager 100 may rank candidate answers based on the passage as:

1) 0.40 Illinois
2) 0.35 Smith
3) 0.33 brother Hyrum
4) 0.29 Mormon
5) 0.2 anti-Mormon mob.

In this example, "Smith", "Illinois", and "Mormon" are clearly not the correct answers, even though answer ranking 355 ranked them higher than "anti-Mormon mob." As such, even though none of the candidate answers has a confidence score above 0.5, knowledge manager 100 uses unreasonable answer filter 360 to filter out the unreasonable answers, which are different from "wrong" answers. For example, a wrong answer to the question above is "His brothers" because it seems reasonable that Joseph Smith could have been killed by his brothers. Whereas "Illinois" is an unreasonable answer because it is very unlikely that a location killed Joseph Smith. In turn, unreasonable answer filter 360 removes unreasonable answers from the set of ranked answers and provides a modified set of ranked answers 380 to user interface 370.

Figure 4:
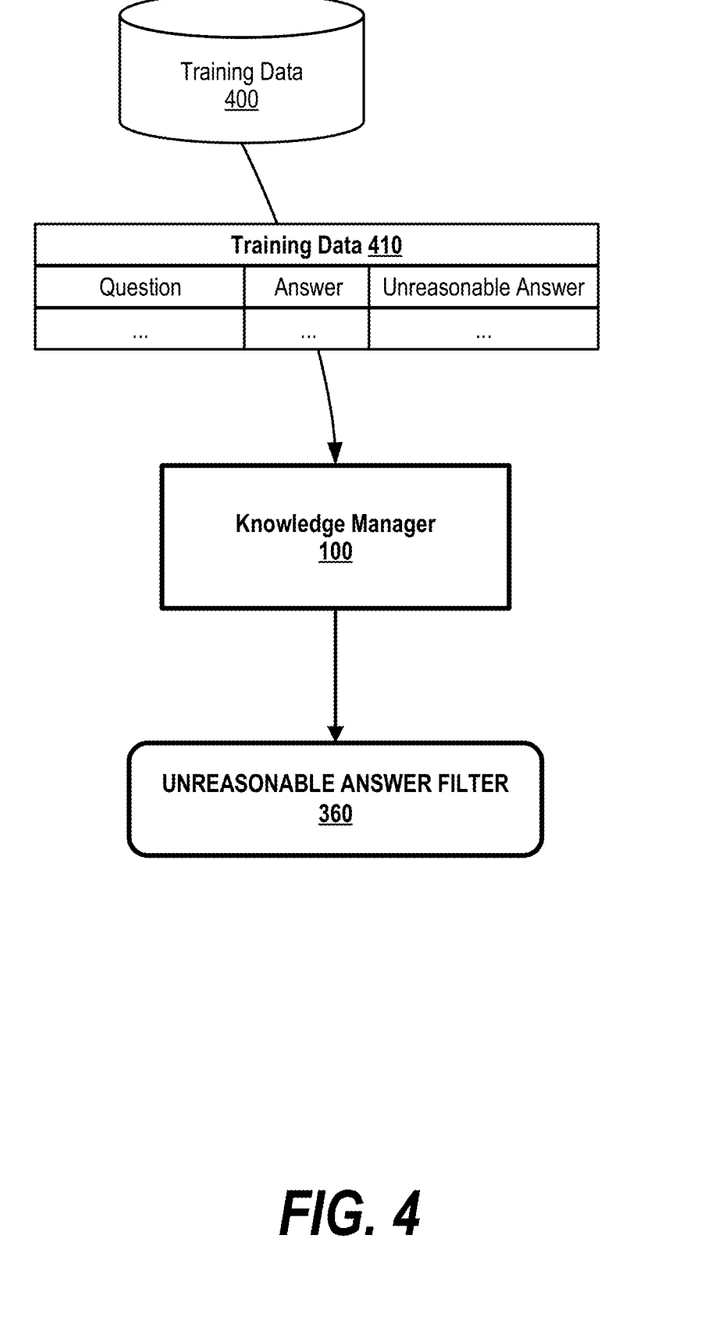
FIG. 4 is an exemplary diagram showing a knowledge manager training an unreasonable answer filter.

FIG. 4 is an exemplary diagram showing a knowledge manager training an unreasonable answer filter. In one embodiment, training data 400 is based upon questions that were answered incorrectly from previous sessions. In one embodiment, training data 400 includes baseline feature vectors comprising a question, an answer, and hand labeled unreasonable answers. For example, training data 400 may include a few thousand pairs of "unreasonable answers," correct answers, and questions.

Knowledge manager 100 trains a linear regression model to distinguish between correct answers and unreasonable answers based on the features described in the document. In other words, although both correct and unreasonable answers may be highly relevant based on information included in a knowledge base, unreasonable answer filter 360 uses the linear regression model to develop dividing lines during the training process between "correct→unreasonable" answers and "correct→incorrect" answers (see FIGS. 5, 6, and corresponding text for further details).

Figure 5:
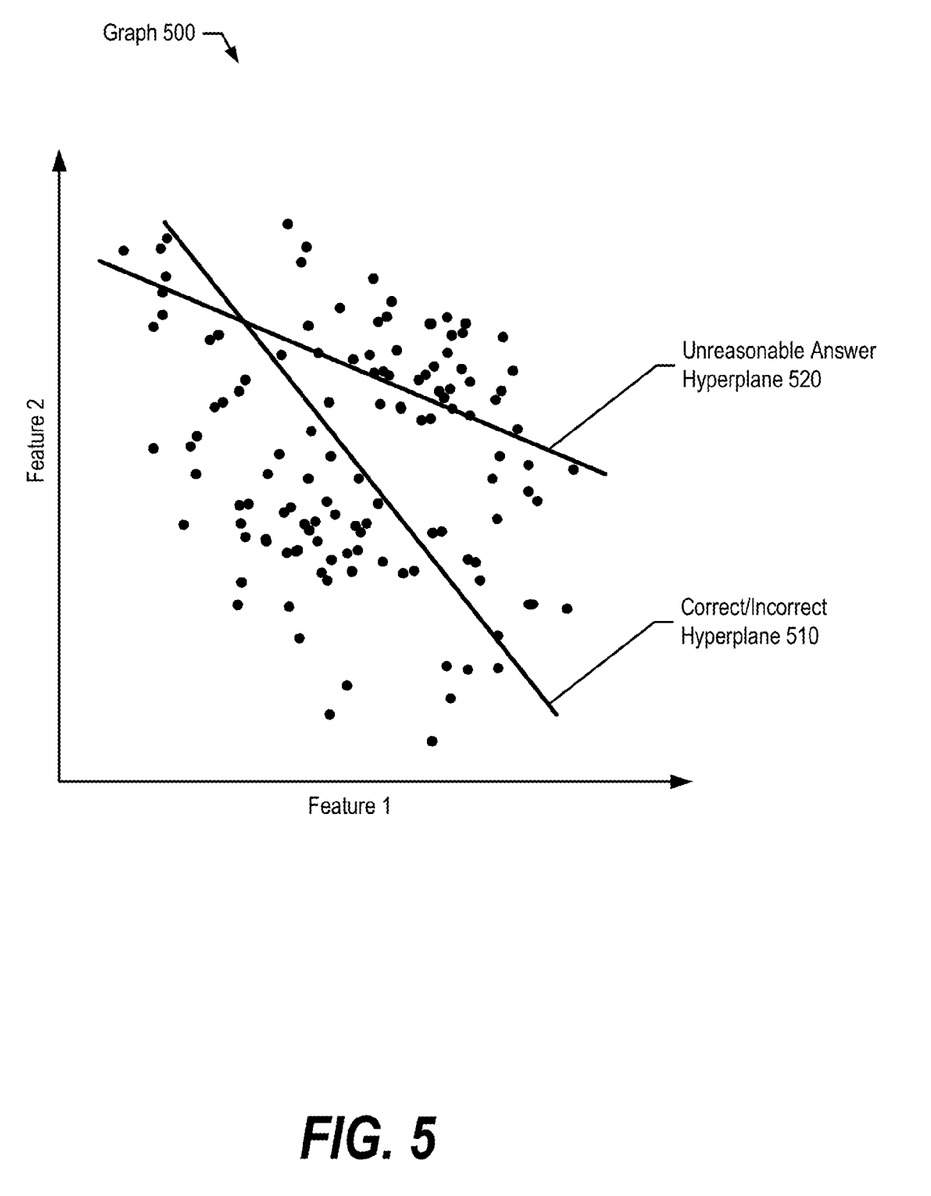
FIG. 5 is an exemplary diagram depicting a graph that plots labeled baseline feature vectors.

FIG. 5 is an exemplary diagram depicting a graph that plots labeled baseline feature vectors. Graph 500 includes baseline feature vector plots relative to feature 1 and feature 2 that are labeled incorrect, correct, and unreasonable. As those skilled in the art can appreciate, feature vectors may represent many more than two feature sets as shown in FIG. 5.

The knowledge manager analyzes the labeled feature vectors and computes hyperplanes 510 and 520, which are proximate "lines" between incorrect answers, correct answers and unreasonable answers. As such, unreasonable answer filter 360 uses hyperplane 520 to determine whether to remove an answer from the set of ranked answers based upon which side of hyperplane 520 the particular answer's plot lies.

In one embodiment, enough training data may not be available to generate a non-linear model fit to solve both correct vs. incorrect answers and correct vs. unreasonable answers. In this embodiment, two linear models may be trained on different datasets (correct/incorrect and correct/unreasonable) and utilized separately as discussed herein to ensure that knowledge manager 100 does not provide a user with unreasonable answers to a question.

Figure 6:
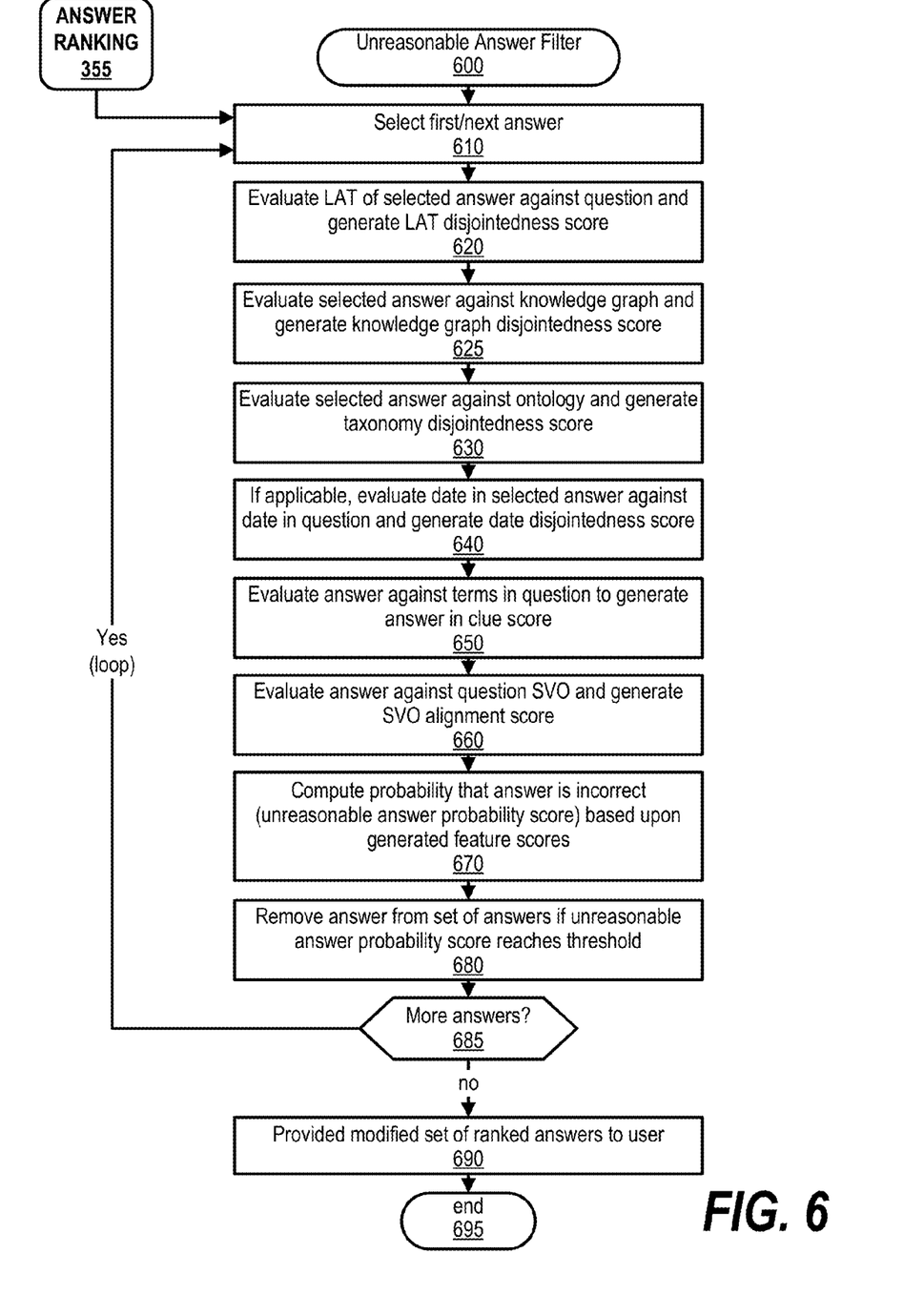
FIG. 6 is a flowchart showing steps taken by an unreasonable answer filter to identify and remove unreasonable answers from a set of ranked candidate answers.

FIG. 6 is a flowchart showing steps taken by an unreasonable answer filter to identify and remove unreasonable answers from a set of ranked candidate answers. As those skilled in the art can appreciate, more or less features (steps) may be used by the unreasonable answer filter than what is shown in FIG. 5 to identify unreasonable answers in a set of answers.

Processing commences at 600, whereupon at step 610, the process selects a first answer from a set of answers provided by answer ranking 155. At step 620, the process evaluates the LAT of the selected answer against the question and generates a LAT disjointedness score. For example "Who is the president of the US?" is asking for a type of "person" or "president". As such, if the selected answer pertains to food, the LAT disjointedness score will be high.

At step 625, the process evaluates the selected answer against a knowledge graph and generates a knowledge graph disjointedness score. In one embodiment, the knowledge graph is based off of billions of documents from the Internet and includes parent>child relationships between entities, as well as relevant counts for how many times a parent child relationship has been seen. In this embodiment, the knowledge graph is used to rule out answers in a few different ways. First, when the selected answer is seen more as a "parent" than a "child," this indicates disjointedness because knowledge manager 100 should rather answer "Albert Einstein" instead of "scientist" or "person". Second, when the answer is not a child of the LAT according to the knowledge graph, disjointedness is also indicated. And third, if most of the "siblings" of the answer do not align with the LAT, disjointedness is indicated.

At step 630, the process evaluates the selected answer against an ontology and generates a taxonomy disjointedness score. In one embodiment, knowledge manager 100 uses a different ontology, such as YAGO (Yet Another Great Ontology), which may be automatically extracted from Wikipedia and other sources. For example, YAGO may have top level types labeled as being disjoint, and the process augments this list to include a few hundred more disjoint LATs. If the LAT and the answer are considered disjoint, the feature is a 1, otherwise it is a zero.

At step 640, the process evaluates a date in the selected answer against a date in the question and generates a date disjointedness score if applicable. For example, if a date is mentioned in the question and there is a date associated with an answer (either within the passages, or through another more structured lookup) that is from a different time period, this indicates disjointedness.

At step 650, the process evaluates the selected answer against terms in the question to generate an answer in clue score. In one embodiment, the correct answer to a question is typically not included in the question, such as "Smith" is probably not the answer to "Who killed Joseph Smith?"

At step 660, the process evaluates the selected answer against the question's subject-verb-object (SVO) properties and generates an SVO alignment score. In one embodiment, knowledge manager 100 may have preprocessed a corpus for "Subject-Verb-Object" triplets and, if there is an SVO in the question (Subject=Who, Verb=kill, Object=Joseph Smith), and the entity type of the subject or object is known, knowledge manager 100 can quickly look up statistics on what is the most likely entity type to complete the triplet. For example, to fill in "?>kill>person" a correct answer would correspond to a "person, weapon, etc." as the top subject types. In another embodiment, unreasonable answer filter 360 may reduce weightings of answers that are not likely to complete the triplet based on collected statistics.

At step 670, the process computes an unreasonable answer probability that the answer is unreasonable based upon feature scores generated from steps 620 through 660. At step 680, the process compares the unreasonable answer probability against a predetermined threshold and removes the selected answer from the set of answers if its corresponding unreasonable answer probability reaches the threshold.

A determination is made as to whether there are more answers in the set of answers to evaluate (decision 685). If there are more answers to evaluate, decision 685 branches to 'yes' branch whereupon the process selects and evaluates the next answer in the set of answers. This looping continues until there are no more answers to evaluate, at which point decision 685 branches to the 'no' branch. At step 690, the process provides the modified set of answers with the unreasonable answers removed to user interface 370 and processing ends at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by a question answer system that includes a memory and a processor, the method comprising:
   training an unreasonable answer filter using a set of training questions, a set of training answers corresponding to the set of training questions, and a set of unreasonable answers corresponding to the set of training questions;
   computing, by the unreasonable answer filter, one or more unreasonable answer probabilities of one or more ranked answers in a set of ranked answers, wherein each of the one or more unreasonable answer probabilities indicate a likelihood that its corresponding ranked answer is an incorrect answer to a question;
   determining, by the unreasonable answer filter, that at least one of the one or more unreasonable answer probabilities reaches a threshold, indicating that their one or more corresponding ranked answers are one or more unreasonable answers to the question;
   removing the one or more unreasonable answers from the set of ranked answers, resulting in a modified set of ranked answers; and
   providing the modified set of ranked answers to a user.

2. The method of claim 1 wherein, prior to computing the set of unreasonable answer probabilities, the method further comprises:
   analyzing the question by the question answer system, wherein the analyzing results in a set of candidate answers;
   ranking the set of candidate answers, resulting in the set of ranked answers; and
   wherein the removing of the one or more unreasonable answers is performed by the unreasonable answer filter subsequent to the ranking of set of candidate answers.

3. The method of claim 1 further comprising:
   generating, based upon the training, a feature set graph that includes both a correct/incorrect hyperplane and an unreasonable answer hyperplane.

4. The method of claim 1 wherein the computing of the one or more unreasonable answer probabilities further comprises:
   selecting one of the ranked answers from the set of ranked answers;
   generating a knowledge graph disjointedness score for the selected ranked answer based upon evaluating the selected ranked answer against a knowledge graph comprising a plurality of entity relationships, wherein at least one of the plurality of entity relationships is selected from the group consisting of a parent-child relationship, an SVO relationship, and an object-attribute relationship; and
   utilizing the knowledge graph disjointedness score in the computing of the unreasonable answer probability for the selected ranked answer.

5. The method of claim 4 further comprising:
   generating a date disjointedness score for the selected ranked answer based upon comparing a date in the selected answer against a date in the question; and
   utilizing the date disjointedness score in the computing of the unreasonable answer probability of the selected ranked answer.

6. The method of claim 4 further comprising:
generating a taxonomy disjointedness score of the selected ranked answer based upon evaluating one or more tags corresponding to the selected ranked answer; and
utilizing the taxonomy disjointedness score in the computing of the unreasonable answer probability of the selected ranked answer.

7. An information handling system comprising:
one or more processors;
a memory coupled to at least one of the processors; and
a set of computer program instructions stored in the memory and executed by at least one of the processors in order to perform actions of:
training an unreasonable answer filter using a set of training questions, a set of training answers corresponding to the set of training questions, and a set of unreasonable answers corresponding to the set of training questions;
computing, by the unreasonable answer filter, one or more unreasonable answer probabilities of one or more ranked answers in a set of ranked answers, wherein each of the one or more unreasonable answer probabilities indicate a likelihood that its corresponding ranked answer is an incorrect answer to a question;
determining, by the unreasonable answer filter, that at least one of the one or more unreasonable answer probabilities reaches a threshold, indicating that their one or more corresponding ranked answers are one or more unreasonable answers to the question;
removing the one or more unreasonable answers from the set of ranked answers, resulting in a modified set of ranked answers; and
providing the modified set of ranked answers to a user.

8. The information handling system of claim 7 wherein, prior to computing the set of unreasonable answer probabilities, at least one of the one or more processors perform additional actions comprising:
analyzing the question by a question answer system, wherein the analyzing results in a set of candidate answers;
ranking the set of candidate answers, resulting in the set of ranked answers; and
wherein the removing of the one or more unreasonable answers is performed by the unreasonable answer filter subsequent to the ranking of set of candidate answers.

9. The information handling system of claim 7 wherein at least one of the one or more processors perform additional actions comprising:
generating, based upon the training, a feature set graph that includes both a correct/incorrect hyperplane and an unreasonable answer hyperplane.

10. The information handling system of claim 7 wherein at least one of the one or more processors perform additional actions comprising:
selecting one of the ranked answers from the set of ranked answers;
generating a knowledge graph disjointedness score for the selected ranked answer based upon evaluating the selected ranked answer against a knowledge graph comprising a plurality of entity relationships, wherein at least one of the plurality of entity relationships is selected from the group consisting of a parent-child relationship, an SVO relationship, and an object-attribute relationship; and
utilizing the knowledge graph disjointedness score in the computing of the unreasonable answer probability for the selected ranked answer.

11. The information handling system of claim 10 wherein at least one of the one or more processors perform additional actions comprising:
generating a date disjointedness score for the selected ranked answer based upon comparing a date in the selected answer against a date in the question; and
utilizing the date disjointedness score in the computing of the unreasonable answer probability of the selected ranked answer.

12. The information handling system of claim 10 wherein at least one of the one or more processors perform additional actions comprising:
generating a taxonomy disjointedness score of the selected ranked answer based upon evaluating one or more tags corresponding to the selected ranked answer; and
utilizing the taxonomy disjointedness score in the computing of the unreasonable answer probability of the selected ranked answer.

13. A computer program product stored in a computer readable storage medium, comprising computer program code that, when executed by an information handling system, causes the information handling system to perform actions comprising:
training an unreasonable answer filter using a set of training questions, a set of training answers corresponding to the set of training questions, and a set of unreasonable answers corresponding to the set of training questions;
computing, by the unreasonable answer filter, one or more unreasonable answer probabilities of one or more ranked answers in a set of ranked answers, wherein each of the one or more unreasonable answer probabilities indicate a likelihood that its corresponding ranked answer is an incorrect answer to a question;
determining, by the unreasonable answer filter, that at least one of the one or more unreasonable answer probabilities reaches a threshold, indicating that their one or more corresponding ranked answers are one or more unreasonable answers to the question;
removing the one or more unreasonable answers from the set of ranked answers, resulting in a modified set of ranked answers; and
providing the modified set of ranked answers to a user.

14. The computer program product of claim 13 wherein, prior to computing the set of unreasonable answer probabilities, the information handling system performs additional actions comprising:
analyzing the question by a question answer system, wherein the analyzing results in a set of candidate answers;
ranking the set of candidate answers, resulting in the set of ranked answers; and
wherein the removing of the one or more unreasonable answers is performed by the unreasonable answer filter subsequent to the ranking of set of candidate answers.

15. The computer program product of claim 13 wherein the information handling system performs additional actions comprising:
generating, based upon the training, a feature set graph that includes both a correct/incorrect hyperplane and an unreasonable answer hyperplane.

16. The computer program product of claim 13 wherein the information handling system performs additional actions comprising:
- selecting one of the ranked answers from the set of ranked answers;
- generating a knowledge graph disjointedness score for the selected ranked answer based upon evaluating the selected ranked answer against a knowledge graph comprising a plurality of entity relationships, wherein at least one of the plurality of entity relationships is selected from the group consisting of a parent-child relationship, an SVO relationship, and an object-attribute relationship; and
- utilizing the knowledge graph disjointedness score in the computing of the unreasonable answer probability for the selected ranked answer.

17. The computer program product of claim 16 wherein the information handling system performs additional actions comprising:
- generating a date disjointedness score for the selected ranked answer based upon comparing a date in the selected answer against a date in the question; and
- utilizing the date disjointedness score in the computing of the unreasonable answer probability of the selected ranked answer.

* * * * *